United States Patent
Matsumiya et al.

(10) Patent No.: US 7,346,432 B2
(45) Date of Patent: Mar. 18, 2008

(54) EARTHQUAKE DISASTER PREVENTION SYSTEM

(75) Inventors: Sadayuki Matsumiya, Kawasaki (JP); Tadao Nakaya, Kawasaki (JP); Yuwu Zhang, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/640,323

(22) Filed: Dec. 18, 2006

(65) Prior Publication Data

US 2007/0144242 A1   Jun. 28, 2007

(30) Foreign Application Priority Data

Dec. 27, 2005   (JP)   ............... 2005-375415

(51) Int. Cl.
  *G05B 13/00* (2006.01)
  *G06F 19/00* (2006.01)
(52) U.S. Cl. .............. 700/275; 700/52; 700/54; 700/56; 702/15; 52/167.1
(58) Field of Classification Search ............. 700/28, 700/52, 54–56, 275, 279; 702/15; 52/167.1, 52/167.9; 340/690; 73/1.85, 82
See application file for complete search history.

(56) References Cited

U.S. PATENT DOCUMENTS 5,563,575 A * 10/1996 Yamamura et al. ......... 340/429

FOREIGN PATENT DOCUMENTS

JP  A 8-334447    12/1996
JP  A 2001-134865  5/2001

* cited by examiner

*Primary Examiner*—Leo Picard
*Assistant Examiner*—Sean Shechtman
(74) *Attorney, Agent, or Firm*—Oliff & Berridge, PLC

(57) ABSTRACT

An earthquake disaster prevention system having: an estimation section to estimate a size of an earthquake from a P-wave of the earthquake detected by the earthquake detector; a stopping control section to control to stop the motion of the operation device when the size of the earthquake estimated by the estimation section exceeds a stopping reference value; a calculation section to calculate at any time the size of the earthquake from the S-wave of the earthquake detected by the earthquake detector; a convergence judgment section to judge convergence of the earthquake by judging whether a predetermined earthquake convergence condition is satisfied from the size of the earthquake calculated by the calculation section; and a resumption control section to resume a predetermined motion of the operation device stopped by the stopping control section when the earthquake is judged to have converged by the convergence judgment section.

8 Claims, 8 Drawing Sheets

FIG.4

| OPERATION DEVICE | STOPPING REFERENCE VALUE | RESUMPTION REFERENCE VALUE |
|---|---|---|
| A | — | — |
| B | — | — |
| C | — | — |
| ⋮ | ⋮ | ⋮ |

FIG.6

| OPERATION DEVICE | EARTHQUAKE LEVEL | MOTION LEVEL |
|---|---|---|
| A | 1 | NORMAL MOTION |
| | 2 | POWER ON |
| | 3 | STANDBY STATE |
| | 4 | MAIN POWER OFF |
| B | 1 | POWER ON |
| | 2 | STANDBY STATE |
| | 3 | MAIN POWER OFF |
| | 4 | MAIN POWER OFF |
| ⋮ | ⋮ | ⋮ |

EARTHQUAKE DISASTER PREVENTION SYSTEM

BACKGROUND OF THE INVENTION

1. Field of the Invention

The present invention relates to an earthquake disaster prevention system.

2. Description of Related Art

Conventionally, there have been known earthquake alarm systems (for example, Patent reference 1) that are having an observational device for detecting preliminary tremor caused by the P-wave (Primary wave) of an earthquake, an analyzer for estimating the seismic focus, intensity and the like of the earthquake by analyzing the detected preliminary tremor, an alarm device for alarming various operation devices on the basis of the analysis made by the analyzer, various operation devices for carrying out earthquake countermeasures such as to stop operation according to the alarm from the alarm device, and the like.

Also known is a hardness tester which is provided with a vibration sensor, and when vibration exceeding a predetermined level is detected by the vibration sensor, stops motion of the tester to reset it, and then automatically resumes motion after a predetermined period of time (for example, Patent reference 2).

[Patent Reference 1] JP-2001-134865A

[Patent Reference 2] JP-Hei-8-334447A

However, in manually recovering various operation devices after stopping the various operation devices at detection of an earthquake, there is a problem that judging an appropriate timing for resumption is so difficult that it may result in inefficient operation. Further, as in Patent Reference 2, when operation is resumed automatically after a predetermined period of time in a uniform manner, there is a problem that the resumption may take place even when the earthquake is not sufficiently converged, resulting in defective operation.

SUMMARY OF THE INVENTION

An object of the present invention is to provide an earthquake disaster prevention system, which better ensures to prevent disaster caused by an earthquake to an operation device, and which enables recovery after the earthquake with more efficiency and certainty.

In accordance with a first aspect of the present invention, the earthquake disaster prevention system to prevent disaster by controlling motion of an operation device according to the size of an earthquake detected by an earthquake detector to detect an earthquake comprises: an estimation section to estimate a size of an earthquake from a P-wave of the earthquake detected by the earthquake detector; a stopping control section to control to stop motion of the operation device when a size of an earthquake estimated by the estimation section exceeds a stopping reference value; a calculation section to calculate at any time a size of an earthquake from a S-wave (Secondary wave) of the earthquake detected by the earthquake detector; a convergence judgment section to judge convergence of an earthquake by judging whether an predetermined earthquake convergence condition is satisfied from a size of the earthquake calculated by the calculation section; and a resumption control section to resume a predetermined motion of the operation device stopped by the stopping control section when the convergence judgment section judges an earthquake to have converged.

In accordance with the first aspect of the invention, an estimation section estimates a size of an earthquake from a P-wave of the earthquake detected by an earthquake detector, when a size of an earthquake estimated by the estimation section exceeds a stopping reference value a stopping control section controls to stop the motion of an operation device, a calculation section calculates the size of an earthquake from the S-wave of the earthquake detected by the earthquake detector, a convergence judgment section judges whether a predetermined earthquake convergence condition is satisfied from a size of an earthquake calculated by the calculation section thereby judging convergence of the earthquake, and when an earthquake is judged to have converged a resumption control section resumes a predetermined motion of the operation device which had been stopped by the stopping control section. Therefore, when an earthquake exceeding the stopping reference value occurs, the operation device is stopped unfailingly, to better ensure prevention of earthquake disaster. Further, because an earthquake is judged to have converged only when the earthquake convergence condition is satisfied, the motion of the operation device is resumed at the timing appropriately judged, and the recovery after an earthquake can be better ensured. Because the resumption of the operation device is carried out automatically when the earthquake convergence condition is satisfied, the recovery after an earthquake can be carried out more efficiently.

Preferably, the earthquake convergence condition includes a condition that a size of an earthquake calculated by the calculation section has become smaller than a resumption reference value.

According to such a system, because the earthquake convergence condition includes a condition that a size of an earthquake calculated by the calculation section has become smaller than a resumption reference value, it is possible to appropriately set the resumption reference value for the operation device in order to accurately judge the timing for recovery after the earthquake, thereby carrying out recovery after the earthquake with more ease and certainty.

Preferably, the earthquake disaster prevention system further comprises: a decision section to decide an earthquake level according to a size of an earthquake calculated by the calculation section; a motion level storage section to store in an associated manner an earthquake level and a motion level of the operation device at the time of resumption; and a level judgment section to judge a motion level of the operation device to be resumed by referring to the motion level storage section according to an earthquake level decided by the decision section; wherein the resumption control section controls the operation device to let it resume at a motion level judged by the level judgment section.

According to such a system, because the decision section decides the earthquake level according to the size of the earthquake calculated by the calculation section, the motion level storage section stores in an associated manner the earthquake level and the motion level of the operation device at the time of resumption, the level judgment section judges the motion level of the operation device to be resumed by referring to the motion level storage section according to the earthquake level decided by the decision section, and the resumption control section controls to resume the operation device at the motion level judged by the level judgment section, it is possible to change the motion level of the operation device to be resumed according to the earthquake level, and to resume the motion of the operation device at a more appropriate motion level.

Preferably, a motion level corresponding to an earthquake level stored in the motion level storage section can be set with respect to each type of the operation device.

According to such a system, because it is possible to set the motion level stored in an associated manner with the earthquake level in the motion level storage section with respect to each type of the operation device, even if there is a plurality of type of operation device to be motion controlled by the earthquake disaster prevention system, it is possible to resume motion of operation devices at a motion level most appropriate for each operation device, thereby enabling recovery after the earthquake more flexibly according to the type of each operation device.

Preferably, the earthquake convergence condition can be set with respect to each type of the operation device.

According to such a system, because it is possible to set the earthquake convergence condition with respect to each type of the operation device, even if there is a plurality of type of operation device to be motion controlled by the earthquake disaster prevention system, it is possible to judge the timing for recovery of the operation device at the earthquake convergence condition most appropriate for each operation device, thereby enabling judgment of the timing for recovery after earthquake more flexibly with respect to each type of the operation device.

Preferably, the stopping reference value can be set with respect to each type of the operation device.

According to such a system, because it is possible to set the stopping reference value with respect to each type of the operation device, even if there is a plurality of type of operation device to be motion controlled by the earthquake disaster prevention system, it is possible to set the stopping reference value according to the earthquake-resistance strength of each operation device, and thus to control to stop motion of the operation device according to the stopping reference value most appropriate for each operation device, thereby enabling stopping of motion of each operation device at occurrence of an earthquake more flexibly according to each type of the operation device.

BRIEF DESCRIPTION OF THE DRAWINGS

The present invention will become more fully understood from the detailed description given hereinbelow and the accompanying drawing which are given by way of illustration only, and thus are not intended as a definition of the limits of the present invention, and wherein;

FIG. 4 is a view showing an example of each of a stopping reference value and a resumption reference value according to the present invention;

FIG. 6 is a view showing an example of a data for level judgment according to the present invention;

DETAILED DESCRIPTION OF THE PREFERRED EMBODIMENTS

A preferred embodiment of the earthquake disaster prevention system of the present invention will be explained in detail with reference to the accompanying drawings.

Figure 1:
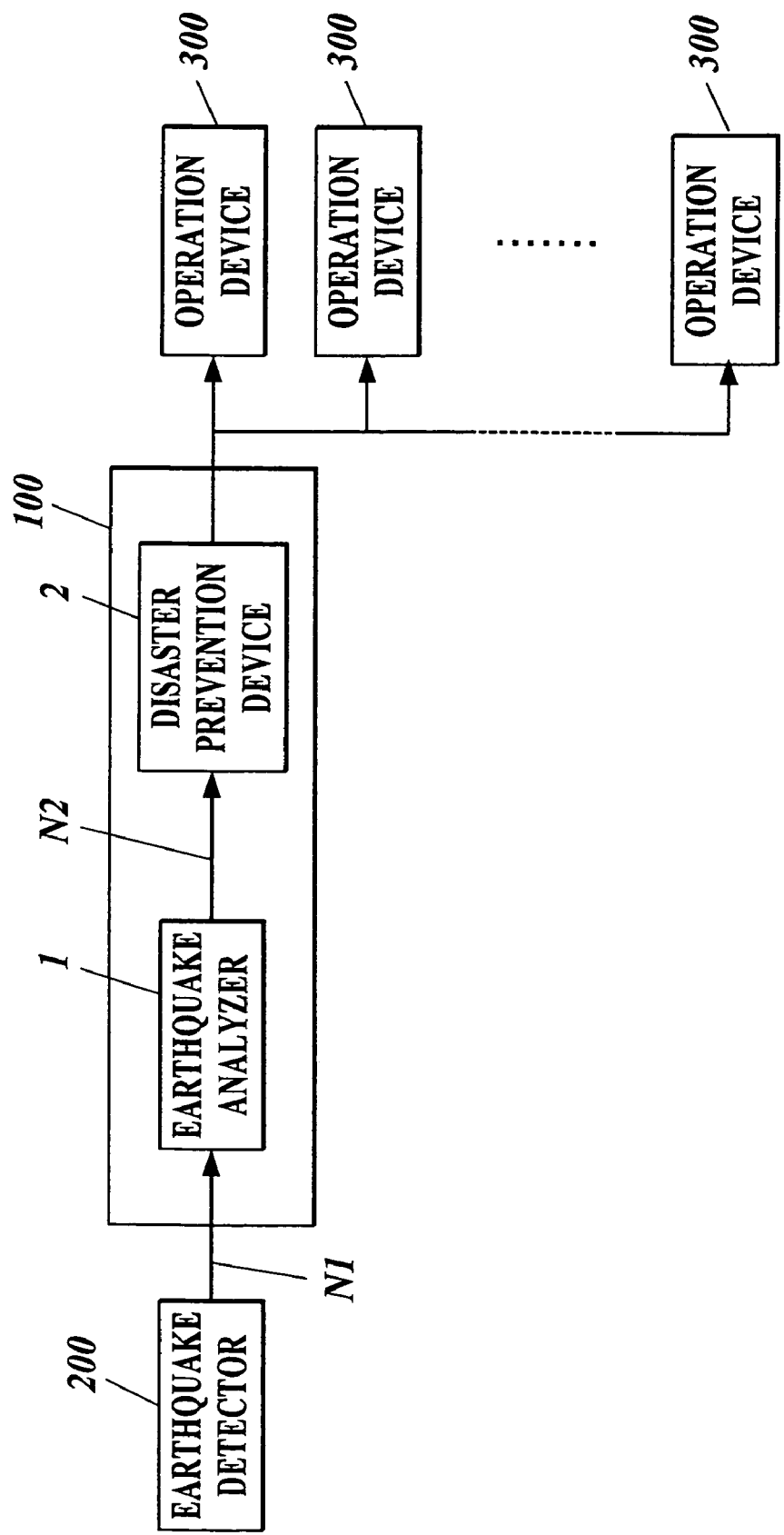
FIG. 1 is a view showing the structure of an earthquake disaster prevention system according to the present invention.

Firstly, the structure of the earthquake disaster prevention system 100 of the present invention will now be explained with reference to FIGS. 1, 2, and 5. FIG. 1 is a view showing the structure of an earthquake disaster prevention system 100 of the present invention.

The earthquake disaster prevention system 100 of the present invention has, for example, as shown in FIG. 1, an earthquake analyzer 1 which is connected with an earthquake detector 200, a disaster prevention device 2 which is connected with the earthquake analyzer 1, and the like.

The disaster prevention device 2 is connected with an operation device 300, and controls the stopping and resumption motions of the operation device 300.

The earthquake detector 200 is, for example, provided with an accelerator meter or the like, and detects an earthquake by detecting acceleration that accompanies vibration at a predetermined spot. More specifically, the earthquake detector 200 detects an earthquake by sending electrical signals (analog signals) proportional to acceleration that accompanies vibration, for example, via communication line N1, as vibration detection signal to the earthquake analyzer 1.

Figure 2:
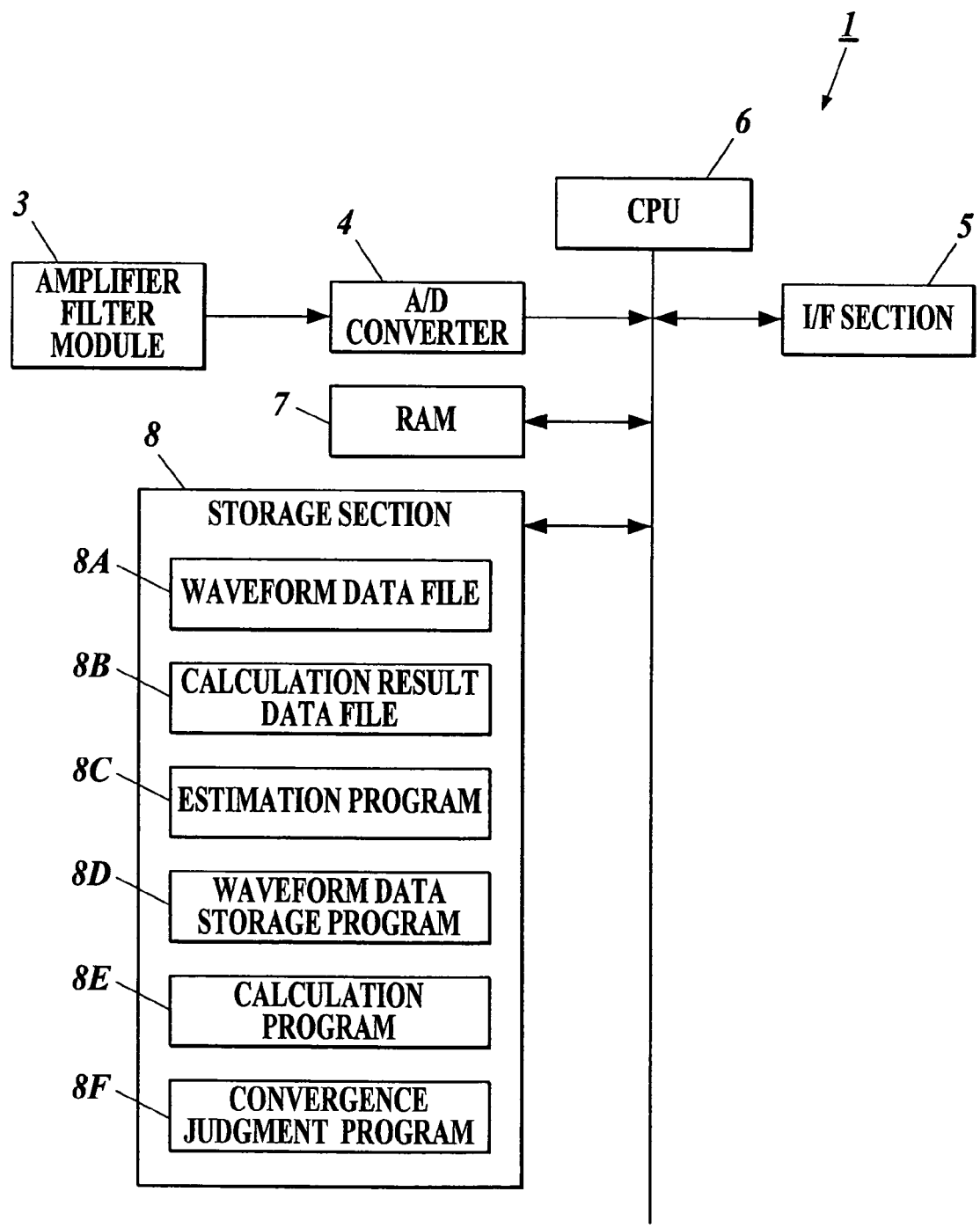
FIG. 2 is a block diagram showing the inner structure of an earthquake analyzer according to the present invention.

FIG. 2 is a block diagram showing the inner structure of the earthquake analyzer 1. The earthquake analyzer 1 has, for example, as shown in FIG. 2, an amplifier filter module 3, an A/D converter 4, an I/F section 5, a CPU (Central Processing Unit) 6, a RAM (Random Access Memory) 7, a storage section 8, and the like.

The amplifier filter module 3 amplifies, for example, the vibration detection signal sent by the earthquake detector 200, and outputs to the A/D converter 4. More specifically, the amplifier module 3 filters signals of a predetermined frequency range, for example, an earthquake wave, and outputs to the A/D converter 4. An earthquake wave may be detected by filtering only the vibration waves having low frequency as well as high amplitude that are typical to earthquake waves.

The A/D converter 4 converts, for example, vibration detection signals amplified and filtered by the amplifier filter module 3, into waveform data which is digital data, and outputs to the CPU 6.

The I/F section 5 performs communication between the earthquake analyzer 1 and the disaster prevention device 2, for example, via communication line N2.

The CPU 6 controls the entire earthquake analyzer 1 by reading out, for example, a processing program or the like stored in the storage section 8 to develop and process on the RAM 7.

The RAM 7 develops, for example, a processing program or the like performed by the CPU 6, and stores the inputted data, processing results of the processing program, or the like into a data storage-area.

The storage section 8 has, for example, a recording medium (not shown) where programs, data and the like are stored beforehand. The recording medium consists of, for example, a semiconductor memory or the like. The storage section 8 stores various data for letting the CPU 6 function to control the entire earthquake analyzer 1, various processing programs, data processed as a result of performing these programs, and the like. More specifically, the storage section 8 stores, for example, as shown in FIG. 2, a waveform data file 8A, a calculation result data file 8B, an estimation program 8C, a waveform data storage program 8D, a calculation program 8E, a convergence judgment program 8F and the like.

The waveform data file 8A stores, for example, a waveform data outputted from the A/D converter 4.

Figure 3:
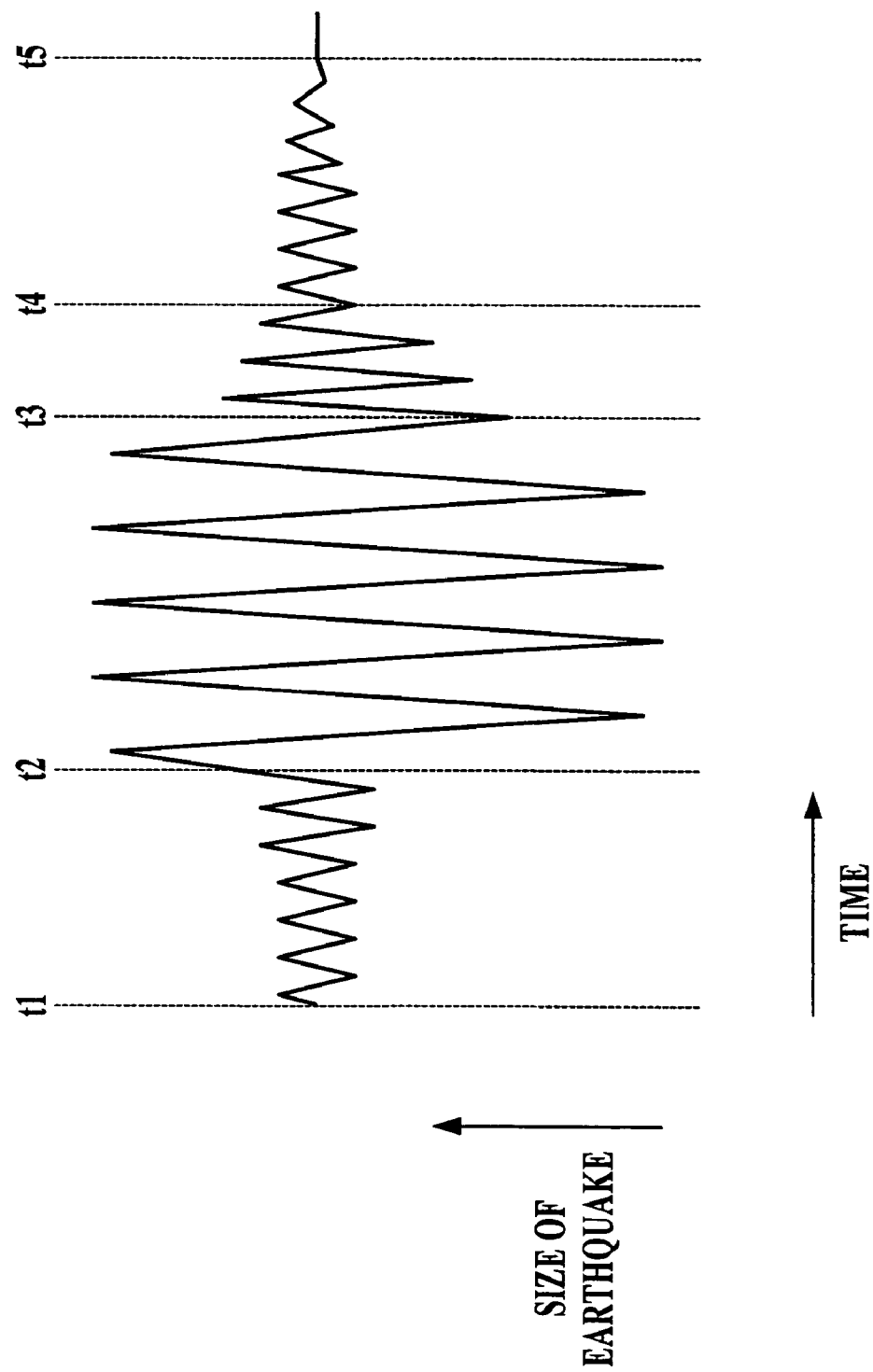
FIG. 3 is a view showing an example of a calculation result according to the present invention.

The calculation result data file 8B stores, for example, the calculation result obtained by the CPU 6 performing the calculation program 8E. An example of the calculation result is shown in FIG. 3. In FIG. 3, the vertical axis indicates the size of an earthquake, while the horizontal axis indicates time. FIG. 3 shows an earthquake occurring at time t1, a preliminary tremor caused by P-wave (Primary wave) continuing from time t1 to t2, and a principal motion caused by S-wave (Secondary wave) continuing from time t2 to t5. Further, it is understood from FIG. 3 that the earthquake reaches its greatest size during time t2 to t3, gradually diminishes in size during time t3 to t4, and after turning into even smaller vibration during time t4 to t5, converges at time t5.

The estimation program 8C is a program for letting, for example, the CPU 6, function to estimate the size of an earthquake from the P-wave of the earthquake detected by the earthquake detector 200. More specifically, the estimation program 8C is a program, for example, when a vibration detection signal is received from the earthquake detector 200, for letting the CPU 6 function to analyze the preliminary tremor caused by the P-wave included in the vibration detection signal, to estimate the size of the earthquake, and to output the estimation result to the disaster prevention device 2. The CPU 6 performs the estimation program 8C to analyze the preliminary tremor caused by the P-wave included in the waveform data processed by the amplifier filter module 3 and the A/D converter converting the vibration detection signal, and to estimate by a commonly known method the size of the principal motion caused by the S-wave which is the size of the earthquake, and outputs the estimation result to the disaster prevention device 2. The size of the earthquake here means, for example, the intensity of the earthquake or the like, and is estimated from the size of the amplitude of the preliminary tremor, the corrugated shape or the like. The CPU 6 functions as an estimation section by performing the estimation program 8C.

The waveform data storage program 8D is a program, for example, when a vibration detection signal is received from the earthquake detector 200, for letting the CPU 6 function to control the amplifier filter module 3 and the A/D converter 4 to convert the vibration detection signal into waveform data, and to store the waveform data in the waveform data file 8A of the storage section 8.

The calculation program 8E is a program for letting, for example, the CPU 6, function to estimate the size of an earthquake at any time from the S-wave of the earthquake detected by the earthquake detector 200. More specifically, the calculation program 8E is a program for letting, for example, the CPU 6, function to calculate the size of an earthquake from the S-wave included in the waveform data stored in the waveform data file 8A of the storage section 8, and to store the calculation result in the calculation result data file 8B of the storage section 8. The size of the earthquake here means, for example, the intensity of the earthquake or-the like. As a consequent of the CPU 6 performing the calculation program 8E, the size of the earthquake at the preliminary tremor caused by P-wave may be calculated in addition to that at the principal motion caused by S-wave. The CPU 6 functions as a calculation section by performing the calculation program 8E.

The convergence judgment program 8F is a program for letting, for example, the CPU 6, function to judge the convergence of an earthquake by judging whether a predetermined earthquake convergence condition is satisfied, from the size of the earthquake calculated as a result of performing the calculation program 8E. The earthquake convergence condition here includes, the condition that the size of the earthquake calculated by performing the calculation program 8E has become smaller than a resumption reference value. The CPU 6 performs the convergence judgment program 8F, for example, to judge whether the size of the earthquake calculated by performing the calculation program 8E has become smaller than the resumption reference value, and judges the convergence of the earthquake. When the size of the earthquake has become smaller than the resumption reference value, the CPU 6 judges the convergence of the earthquake, and outputs the calculation result stored in the calculation result data file 8B of the storage section 8 to the disaster prevention device 2. More specifically, the CPU 6 performs the convergence judgment program 8F, for example, to judge whether the size of the earthquake during time t4 to t5 in the calculation result shown in FIG. 3 has become smaller than the resumption reference value, in order to judge whether the earthquake has converged. The earthquake convergence condition may include a condition that a predetermined period of time has passed after the size of the earthquake calculated by performing the calculation program 8E had become smaller than the resumption reference value, and the like. The earthquake convergence condition may be set with respect to each type of operation device 300. For example, as shown in FIG. 4, the resumption reference value may be changed according to each type of operation device 300, and the predetermined period of time after the size of the earthquake calculated by performing the calculation program 8E has become smaller than the resumption reference value may be changed with respect to each type of operation device 300. The CPU 6 functions as a judgment section by performing the convergence judgment program 8F.

Figure 5:
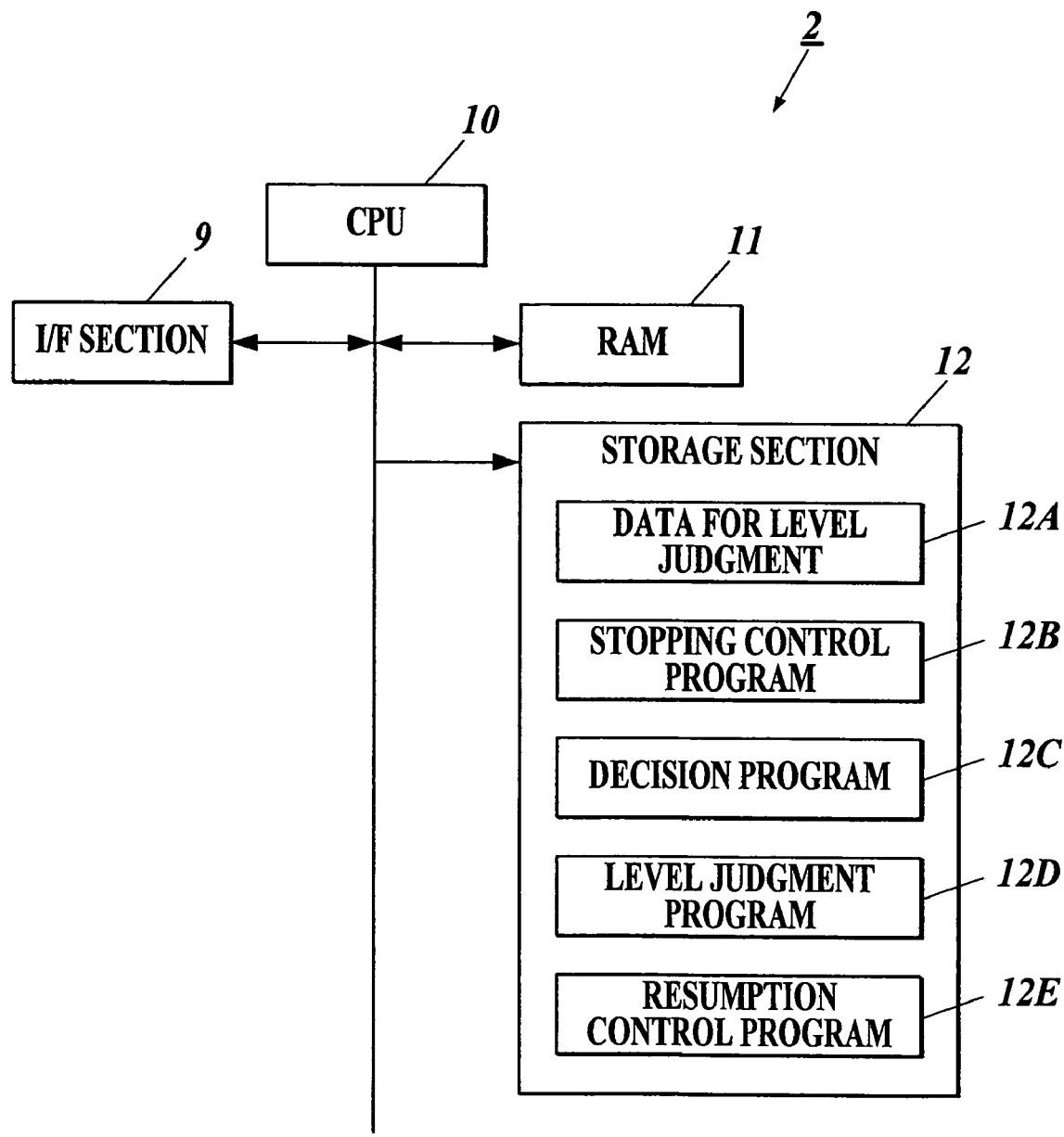
FIG. 5 is a block diagram showing the inner structure of a disaster prevention device according to the present invention.

FIG. 5 is a block diagram showing the inner structure of the disaster prevention device 2. The disaster prevention device 2 has, for example, as shown in FIG. 5, an I/F section 9, an CPU 10, an RAM 11, an storage section 12 and the like.

The I/F section 9 performs communication between the disaster prevention device 2 and the earthquake analyzer 1, for example, via communication line N2.

The CPU 10 controls the entire disaster prevention device 2 by reading out, for example, a processing program or the like stored in the storage section 12 to develop and process on the RAM 11.

The RAM 11 develops in a program storage are in the RAM 11, for example, a processing program or the like performed by the CPU 10, and stores the inputted data, processing results of the processing program, or the like in a data storage area.

The storage section 12 has, for example, a recording medium (not shown) where programs, data and the like are stored beforehand. The recording medium consists of, for example, a semiconductor memory or the like. The storage section 12 stores various data for letting the CPU 10 function to control the entire disaster prevention device 2, various processing programs, data processed as a result of performing these programs, and the like. More specifically, the storage section 12 stores, for example, as shown in FIG. 5, a data for level judgment 12A, a stopping control program 12B, a decision program 12C, a level judgment program 12D, a resumption control program 12E, and the like.

The data for level judgment 12A is a data in which, for example, the earthquake level and the motion level of the operation device 300 at the time of resumption are matched. An example of the data for level judgment 12A is shown in FIG. 6. The earthquake level here means, for example, the intensity, the duration, and the like of the earthquake. The motion level means the level of the motion state of the operation device 300 connected with the disaster prevention device 2; for example, main power off state, standby state, power on state, normal motion state, and the like. The motion level corresponding to the earthquake level may be set, for example, as shown in FIG. 6, with respect to each type of operation device 300. The storage section 12 functions as a motion level storage section by storing the data for level judgment 12A.

More specifically, the main power off state means, for example, a state in which electricity supple to the operation device is being shut off. For example, when an earthquake that may have a hugely damaging effect on the function of the operation device 300, such as a large-scale earthquake or an epicentral earthquake occurs, the CPU 10 performs the level judgment program 12D to judge the motion level of the operation device 300 to be resumed to be in the main power off state. Then, in this case, for example, after inspection of the building and the like, normal motion of the operation device 300 is manually resumed.

The standby state means, for example, a state in which electrical supply to the operation device 300 is being continued but the operation device 300 is powered off. When an earthquake of a relatively large scale that may have a damaging effect on the function of the operation device 300 occurs, the CPU 10 performs the level judgment program 12D to judge the motion level of the operation device 300 to be resumed to be in the standby state. Then, in this case, for example, after inspection according to the estimation information and the like on the damage on each operation device 300 estimated by the disaster prevention device 2, normal motion of the operation device 300 is manually resumed.

The power on state means, for example, a state in which electrical supply to the operation device 300 is being continued, and the operation device 300 is powered on, but the normal motion of the operation device 300 stopped. When an earthquake of a smaller scale that will not have a damaging effect on the function of the operation device 300 itself but may lead to defect in its products, or may affect the measurement data occurs, the CPU 10 performs the level judgment program 12D to judge the motion level of the operation device 300 to be resumed to be in the power on state. Then, in this case, for example, after removal of the defective products, discarding the measurement data, or the like, normal motion of the operation device 300 is manually resumed.

The normal motion state means, for example, a state in which electrical supply to the operation device 300 is being continued, the operation device 300 is powered on, and the normal motion of the operation device 300 resumed. When an earthquake of a small scale that will neither have a damaging effect on the function of the operation device 300 itself, nor lead to defect in its products or measurement data occurs, the CPU 10 performs the level judgment program 12D to judge the motion level of the operation device 300 to be resumed to be in the normal motion state. Then, in this case, normal motion of the operation device 300 is automatically resumed.

The stopping control program 12B is a program, for example, when the size of an earthquake according to the estimation result outputted by the earthquake analyzer 1 exceeds the stopping reference value, for letting the CPU 10 function to control to stop motion of the operation device 300. More specifically, the stopping control program 12B is a program, for example, when the estimation result from the earthquake analyzer 1 is received, to let the CPU 10 function to judge whether the size of the earthquake according to the estimation result exceeds the stopping reference value, and when the size of the earthquake according to the estimation result exceeds the stopping reference value, to control to stop the motion of the operation device 300. The stopping reference value here means, for example, the intensity of the earthquake and the like. The stopping reference value may be set with respect to each type of the operation device 300, and for example, as shown in FIG. 4, the stopping reference value may be changed with respect to each type of operation device 300. The CPU 10 functions as a stopping control section by performing the stopping control program 12B.

The decision program 12C is a program, for example, for letting the CPU 10 to function to decide the earthquake level according to the size of the earthquake calculated in the earthquake analyzer 1. More specifically, the decision program 12C is a program, for example, for letting the CPU 10 to function to judge the part where the size of the earthquake reaches its greatest (for example, the t2 to t3 part in FIG. 3) according to the calculation result outputted by the earthquake analyzer 1, and to decide the earthquake level according to the part. The CPU 10 functions as a decision section by performing the decision program 12C.

The level judgment program 12D is a program, for example, for letting the CPU 10 to function to judge the motion level of the operation device 300 to be resumed by referring to the data for level judgment 12A according to the earthquake level decided by performing the decision program 12C. More specifically, the level judgment program 12D is a program, for example, for letting the CPU 10 refer to the data for level judgment 12A according to the earthquake level decided by performing the decision program 12C, and pick out the appropriate motion level. The CPU 10 functions as a level judgment section by performing the level judgment program 12D.

The resumption control program 12E is a program, for example, for letting the CPU 10, when calculation result is received from the earthquake analyzer, function to resume motion of the operation device 300. More specifically, the resumption control program 12E is a program, for example, for letting the CPU 10 function to control to resume motion of the operation device 300, at the motion level judged by performing the level judgment program 12D. For example, the CPU 10, when the motion level judged by performing the level judgment program 12D is the standby state, performs the resumption control program 12E to continue electrical supply to the operation device 300 and simultaneously to have the operational device 300 powered off. The CPU 10 functions as a resumption control section by performing the resumption control program 12E.

Figure 7:
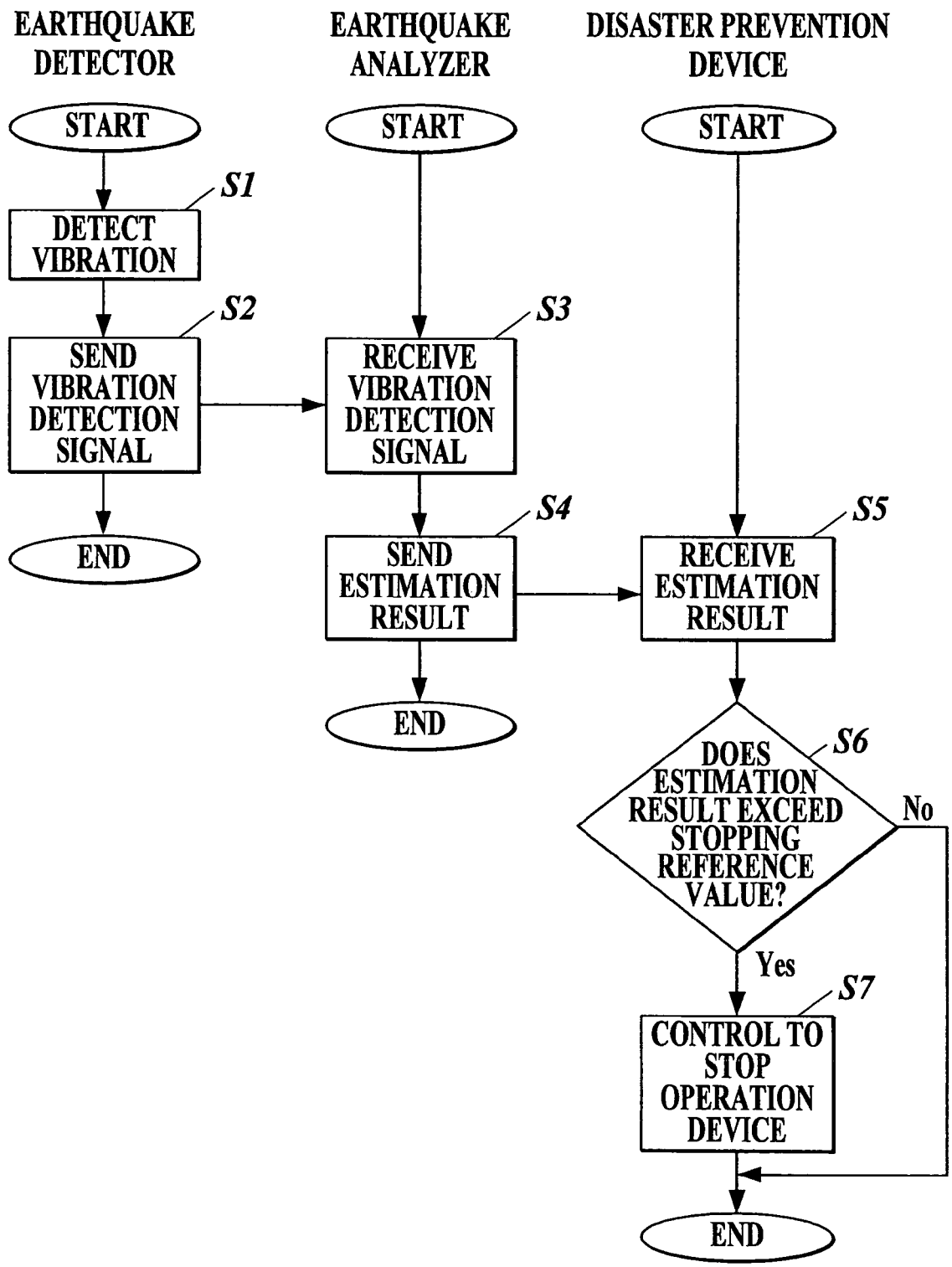
FIG. 7 is a flow chart explaining control motion of the earthquake disaster prevention system according to the present invention to stop an operation device at occurrence of an earthquake.

Now, the control motion of the earthquake disaster prevention system 100 having the above mentioned structure to stop the operation device 300 when an earthquake occurs will be explained with reference to the flow chart of FIG. 7.

First, when an earthquake occurs, the earthquake detector 200 detects the earthquake (step S1), and a vibration detection signal is sent to the earthquake analyzer 1 (step S2).

Next, when the earthquake analyzer 1 receives the vibration detection signal (step S3), the CPU 6 performs the estimation program 8C to estimate the size of the earthquake by analyzing the preliminary tremor caused by the P-wave included in the vibration detection signal, and then sends the estimation result to the disaster prevention device 2 (step S4).

Then, when the disaster prevention device 2 receives the estimation result from the earthquake analyzer 1 (step S5), the CPU 10 performs the stopping control program 12B to judge whether the size of the earthquake according to the estimation result exceeds the stopping reference value (step S6).

When the CPU 10 judges the size of the earthquake according to the estimation result in step S6 as not exceeding the stopping reference value (step S6; No), this process is concluded.

When the CPU 10 judges the size of the earthquake according to the estimation result in step S6 as exceeding the stopping reference value (step S6; Yes), the CPU 10 stops the motion of the operation device 300 by performing the stopping control program 12B.

Figure 8:
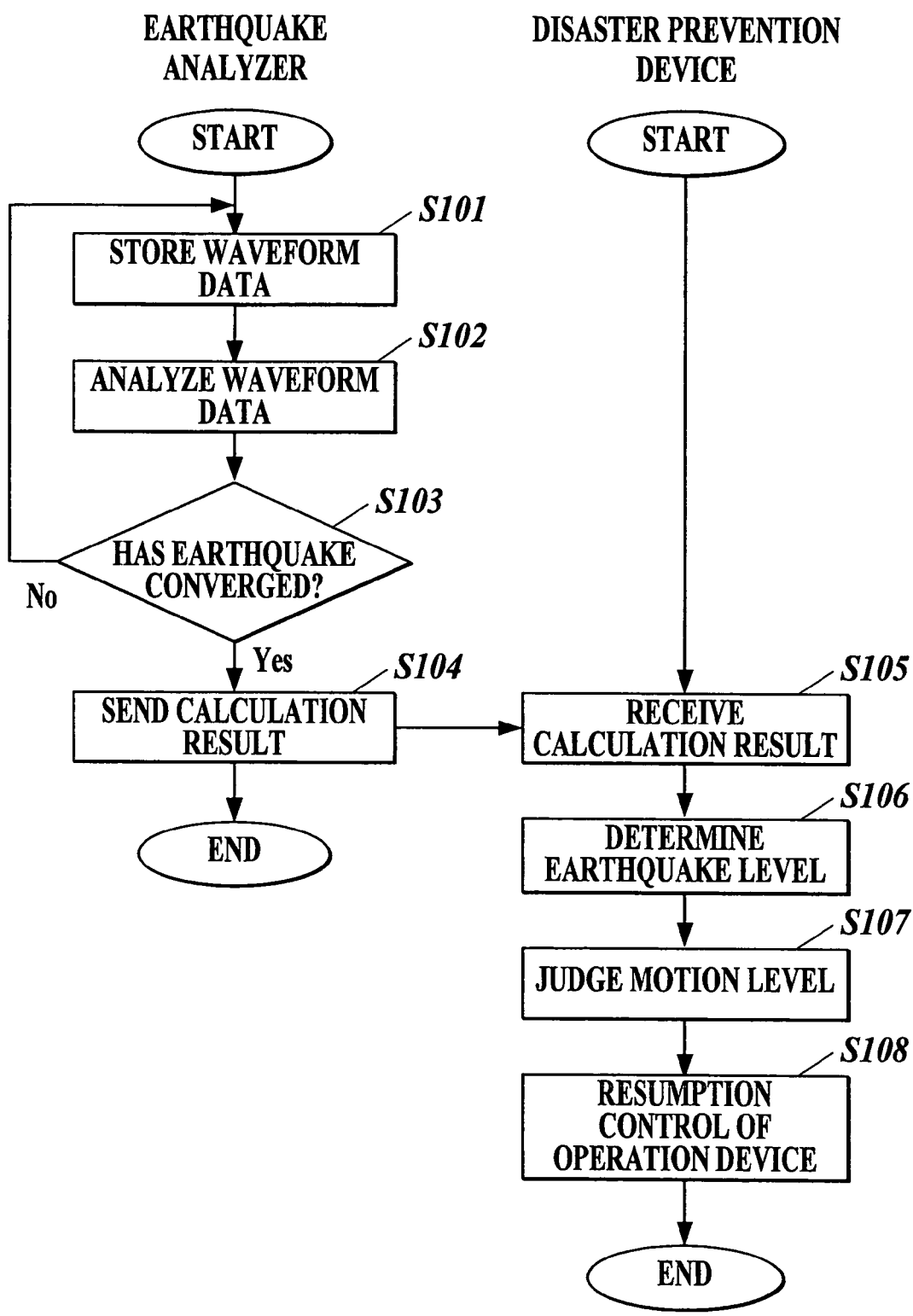
FIG. 8 is a flow chart explaining control motion of the earthquake disaster prevention system according to the present invention to resume the operation device after convergence of an earthquake.

Now, the control motion of the earthquake disaster prevention system 100 of the present invention to resume the operation device 300 after an earthquake converges will be explained with reference to the flow chart of FIG. 8.

First, in the earthquake analyzer 1, the CPU 6 performs the waveform data storage program 8D to control the amplifier filter module 3 and the A/D converter 4, to convert the vibration detection signal received from the earthquake detector 200 into waveform data, and to store the waveform data in the waveform data file 8A of the storage section 8 (step S101).

Next, the CPU 6 performs the calculation program.8E to analyze the principal motion caused by the S-wave included in the waveform data stored in the waveform data file 8A, and to calculate the size of the earthquake at any time (step S102).

Then, the CPU 6 performs the convergence judgment program 8F to judge whether the predetermined earthquake convergence condition is satisfied according to the size of the earthquake calculated in step S102, and to judge convergence of the earthquake (step S103).

When in step S103 the CPU 6 judges the earthquake not to have converged (step S103; No), this process returns to step S101.

When in step S103 the CPU 6 judges the earthquake to have converged (step S103; Yes), the CPU-6 sends the calculation result stored in the calculation result data file 8B of the storage section 8 according to the performance of the convergence judgment program 8F (step S104).

Then, when the disaster prevention device 2 receives the calculation result (step S105), in the disaster prevention device 2, the CPU 10 performs the decision program 12C to decide the earthquake level according to the calculation result (step S106).

Then, the CPU 10 performs the level judgment program 12D to judge the motion level of the operation device 300 to be resumed by referring to the data for level judgment 12A according to the earthquake level decided in step S106, and by selecting the appropriate motion level (step S107).

Then, the CPU 10 performs the resumption control program 12E to control resumption of the operation device 300 according to the motion level judged in step S107 (step S108).

According to the earthquake disaster prevention system 100 of the present invention as described above, in the earthquake analyzer 1, the CPU 6 performs the estimation program 8C to estimate the size of an earthquake from the P-wave of the earthquake detected by the earthquake detector 200, when the detected size of the earthquake exceeds the stopping reference value the CPU 10 in the disaster prevention device 2 performs the stopping control program 12B to control to stop the motion of the operation device 300, in the earthquake analyzer 1 the CPU 6 performs the calculation program 8E to calculate the size of the earthquake from the S-wave of the earthquake detected by the earthquake detector 200, the CPU 6 performs the convergence judgment program 8F to judge whether the predetermined earthquake convergence condition is satisfied from the size of the earthquake calculated and thereby to judge the convergence of the earthquake, when the earthquake is judged to have converged in the disaster prevention device 2 the CPU 10 performs the resumption control program 12E to resume the predetermined motion of the stopped operation device 300 thereby stopping without fail the operation device 300 when an earthquake exceeding the stopping reference value occurs, enabling prevention of earthquake disaster with more certainly. When the earthquake convergence condition is satisfied, because the resumption of the operation device 300 is performed automatically, the recovery after the earthquake can be done more efficiently.

Further, because the earthquake convergence condition includes the condition that the size of the earthquake calculated by the CPU 6 in the earthquake analyzer 1 performing the calculation program 8E has become smaller than the resumption reference value, by setting an appropriate resumption reference value for the operation device 300, the timing of recovery after the earthquake can be judged accurately and the recovery after the earthquake can be undertaken with more ease and certainty.

Further, in the disaster prevention device 2, the CPU 10 performs the decision program 12C to decide the earthquake level according to the size of the earthquake calculated in the earthquake analyzer 1, the earthquake level and the motion level of the operation device 300 at the time of resumption are stored in the storage section 12 of the disaster prevention device 2 in an associated manner as the data for level judgment 12A, the CPU 10 performs the level judgment program 12D to judge the motion level of the operation device 300 to be resumed with reference to the data for level judgment 12A of the storage section 12 according to the determined earthquake level, the CPU 10 performs the performs the resumption control program 12E to control to resume the operation device 300 at the motion level judged, thereby enabling change of the motion level of the operation device 300 to be resumed according to the earthquake level according to the earthquake level, and enabling resumption of the motion of the operation device 300 at a more appropriate motion level.

Because the motion level corresponding to the earthquake level stored as the data for level judgment 12A in the storage section 12 can be set with respect to each type of the operation device 300, even if there is a plurality of type of operation device 300 to be motion controlled by the earthquake disaster prevention system 100, it is possible to judge the timing for recovery of the operation device 300 with the most appropriate earthquake convergence condition with respect to each operation device 300, and the recovery after earthquake can be done more flexibly according to the type of each operation device 300.

Because the earthquake convergence condition can be set with respect to each type of the operation device 300, even if there is a plurality of type of the operation device 300 to be motion controlled by the earthquake disaster prevention system 100, it is possible to judge the timing for recovery of the operation device 300 on the most appropriate earthquake convergence condition with respect to each operation device 300, and to judge more flexibly the timing for recovery after earthquake according to the type of each operation device 300.

In the present embodiment, the earthquake analyzer 1 is provided with the estimation section, the calculation section, the convergence judgment section, while various functions of the earthquake analyzer 1 and the disaster prevention device 2 may be provided in whichever of the two devices, or else, all such functions may be provided in either one of the two devices.

Alternatively, various functions provided in the earthquake analyzer 1 and the disaster prevention device 2 may by provided in the operation device 300. The earthquake analyzer 1 and the disaster prevention device 2 may be provided in each operation device 300.

The present U.S. patent application claims a priority under the Paris Convention of Japanese patent application No. 2005-375415 filed on Dec. 27, 2005, and shall be a basis of correction of an incorrect translation.

What is claimed is:

1. An earthquake disaster prevention system to prevent disaster by controlling a motion of an operation device according to a size of an earthquake detected by an earthquake detector to detect an earthquake comprising:
   an estimation section to estimate a size of an earthquake from a P-wave of the earthquake detected by the earthquake detector;
   a stopping control section to control to stop the motion of the operation device when the size of the earthquake estimated by the estimation section exceeds a stopping reference value;
   a calculation section to calculate at any time the size of the earthquake from the S-wave of the earthquake detected by the earthquake detector;
   a convergence judgment section to judge convergence of the earthquake by judging whether a predetermined earthquake convergence condition is satisfied from the size of the earthquake calculated by the calculation section; and
   a resumption control section to resume a predetermined motion of the operation device stopped by the stopping control section when the earthquake is judged to have converged by the convergence judgment section.

2. The earthquake disaster prevention system as claimed in claim 1, wherein the earthquake convergence condition includes a condition that the size of the earthquake calculated by the calculation section has become smaller than a resumption reference value.

3. The earthquake disaster prevention system as claimed in claim 1, comprising:
   a decision section to decide an earthquake level from the size of the earthquake calculated by the calculation section;
   a motion level storage section to store the earthquake level and a motion level of the operation device in an associated manner; and
   a level judgment section to judge the motion level of the operation device to be resumed by referring to the motion level storage section according to the earthquake level decided by the decision section,
   wherein the resumption control section controls to resume the operation device at the motion level judged by the level judgment section.

4. The earthquake disaster prevention system as claimed in claim 2, comprising:
   a decision section to decide an earthquake level from the size of the earthquake calculated by the calculation section;
   a motion level storage section to store the earthquake level and a motion level of the operation device in an associated manner; and
   a level judgment section to judge the motion level of the operation device to be resumed by referring to the motion level storage section according to the earthquake level decided by the decision section,
   wherein the resumption control section controls to resume the operation device at the motion level judged by the level judgment section.

5. The earthquake disaster prevention system as claimed in claim 3, wherein the motion level corresponding to the earthquake level stored in the motion level storage section can be set with respect to each type of the operation device.

6. The earthquake disaster prevention system as claimed in claim 4, wherein the motion level corresponding to the earthquake level stored in the motion level storage section can be set with respect to each type of the operation device.

7. The earthquake disaster prevention system as claimed in claims 1, wherein the earthquake convergence condition can be set with respect to each type of the operation device.

8. The earthquake disaster prevention system as claimed in claims 1, wherein the stopping reference value can be set with respect to each type of the operation device.

* * * * *